United States Patent [19]

Young

[11] Patent Number: 4,943,918

[45] Date of Patent: Jul. 24, 1990

[54] SEISMIC DATA PROCESSING METHOD

[75] Inventor: Roger A. Young, Bartlesville, Okla.

[73] Assignee: Phillips Petroleum Company, Bartlesville, Okla.

[21] Appl. No.: 690,086

[22] Filed: Jan. 9, 1985

[51] Int. Cl.$^5$ .......................... B01V 1/00; B01V 1/20; G06F 15/20
[52] U.S. Cl. ........................................ 364/421; 367/37
[58] Field of Search ........................ 364/421, 550–551; 181/0.5, 101, 107–108, 112, 401; 367/14, 21, 36–37; 73/649, 658

[56] References Cited

U.S. PATENT DOCUMENTS

| | | | |
|---|---|---|---|
| 2,203,272 | 6/1940 | Sparks | 181/0.5 |
| 2,596,463 | 5/1952 | Barthelmes | 181/0.5 |
| 2,718,928 | 9/1955 | Weiss | 181/0.5 |
| 2,718,929 | 9/1955 | Weiss | 181/0.5 |
| 3,003,577 | 10/1961 | Itria | 181/0.5 |
| 3,629,798 | 12/1971 | Rockwell | 340/15.5 |
| 4,072,208 | 2/1978 | Goodhart | 181/401 |
| 4,126,203 | 11/1978 | Miller | 181/109 |
| 4,218,766 | 8/1980 | Parrack et al. | 364/421 X |
| 4,314,364 | 2/1982 | Bickel | 364/421 X |
| 4,346,461 | 8/1982 | Muir | 364/421 X |
| 4,528,649 | 7/1985 | Gassaway et al. | 367/36 |
| 4,532,618 | 7/1985 | Wener | 364/421 X |
| 4,564,927 | 1/1986 | Kolb | 364/421 X |

OTHER PUBLICATIONS

P. Berington, *Data Reduction and Error analysis for the Physical Scientist*, McGraw Hill, Inc. 1969, pp. 134–163.
K. Aki et al., *Quantitative Seismology: Theory and Methods*, vol. 1, Freeman 1980, pp. 643–645.
K. Bullen, *An Introduction to the Theory of Seismology*, Cambridge University Press pp. 126–128.
M. Dobrin, *Introduction to Geophysical Prospecting*, McGraw Hill, 1976, pp. 202–210.

Primary Examiner—Gary V. Harkcom
Attorney, Agent, or Firm—William R. Sharp

[57] ABSTRACT

A seismic method for determining the thickness of a subterranean layer of interest and the velocity of seimic in the layer. Seismic waves are transmitted into the layer, and a plurality of waves are detected wherein each detected wave is reflected from a different point along the lower boundary of the layer. Two parameters, $\Delta x$ and $\Delta T$, are determined for each reflected wave. $\Delta x$ is defined as the horizontal distance a wave travels between the upper boundary and the lower boundary of the layer, and $\Delta T$ is defined as the one way travel time of a wave between the upper boundary and the lower boundary of the layer. A set of data pairs are obtained, wherein each data pair includes a $(\Delta x)^2$ value and a $(\Delta T)^2$ value. These pairs are fitted to a linear function so as to yield slope value and intercept values. These values may be utilized to calculate the wave velocity and thickness of the layer.

3 Claims, 5 Drawing Sheets

SEISMIC DATA PROCESSING METHOD

BACKGROUND OF THE INVENTION

This invention relates to a seismic data processing method whereby thickness and velocity characteristics of a subterranean layer can be determined.

It is frequently desirable in seismic exploration for oil and gas to determine the wave velocity characteristics and thickness of a subterranean layer of interest. Velocity characteristics of a layer are valuable to the seismologist in identifying the material which makes up the layer, and the layer thickness provides valuable information as to necessary drilling depths. Conventional reflection and refraction techniques can be used to successfully calculate velocity and thickness of a subterranean layer, however, only if velocity increases continuously with depth. As to techniques utilizing refraction, a seismic wave is transmitted to an interface between layers, where the wave must be refracted so as to travel along the interface and return to the surface of the earth where it is detected. Such a refraction phenomenon cannot occur in the case of a high velocity layer overlying a low velocity layer, since the wave is refracted in the wrong direction (toward the normal rather than away from the normal, wherein the normal is a line perpendicular to the interface and passing through the point at which the wave path intersects the interface). With respect to techniques utilizing reflection, reflections from both boundaries of a layer are required to determine thickness and velocity. Accuracy of thickness and velocity determinations utilizing reflection techniques depend to a large degree on the direction in which the wave is refracted at the upper boundary. More accurate results are obtained where the downward traveling wave is refracted away from the normal by the upper boundary. Where a high velocity layer overlies a low velocity layer, the upper boundary of the low velocity layer will refract a downward traveling wave toward the normal rather than away from the normal. Thus, reflection techniques give inaccurate, and sometimes unuseable, thickness and velocity determinations in this situation.

The above described situation in which a low velocity layer of interest lies under a high velocity layer is often found in frigid regions such as the Arctic. In such regions, an upper layer of the earth is typically frozen year around. This frozen layer is referred to as permafrost. The layer of the earth immediately beneath the permafrost layer is unfrozen, and thus transmits seismic waves therethrough at a lower velocity than the permafrost layer.

SUMMARY OF THE INVENTION

It is, therefore, an object of the invention to provide a seismic method capable of determining thickness and velocity characteristics of a low velocity layer of the earth lying under a high velocity layer.

The above object is realized in a seismic method of determining the thickness of a subterranean layer of interest and the velocity of seismic waves in the layer. The method includes the steps of transmitting seismic waves into the layer and detecting a plurality of waves wherein each said detected wave is reflected from a different point along the lower boundary of the layer. A parameter $\Delta x$ is determined for each reflected wave wherein $\Delta x$ is defined as the horizontal distance a wave travels between the upper boundary and the lower boundary of the layer. In addition, a parameter $\Delta T$ is determined for each reflected wave, wherein $\Delta T$ is defined as the one way travel time of a wave between the upper boundary and the lower boundary of the layer. These $\Delta x$ and $\Delta T$ values can be squared to yield $(\Delta x)^2$ and $(\Delta T)^2$ values. Thus, a set of data pairs are obtained, wherein each data pair comprises a $(\Delta x)^2$ value and a $(\Delta T)^2$ value. A linear function relating $(\Delta T)^2$ and $(\Delta x)^2$ may be fitted to the data pairs so as to yield a slope (m) value and an intercept (b) value. These slope and intercept values may then be employed to calculate the thickness and velocity of the layer.

DESCRIPTION OF THE PREFERRED EMBODIMENTS

An embodiment of the invention will now be described with reference to the drawings, wherein thickness and velocity of seismic waves with respect to a layer of interest can be determined. It should be understood that the embodiment described below involves a simple model in which the layer of interest lies immediately below a layer whose upper boundary is the surface of the earth. However, the method of the present invention could be applied to a layer of interest having multiple layers between it and an uppermost layer. It should also be understood that various steps in the method as described herein may be in a different order.

As used herein, the direction in which a wave is traveling at any point along the wave is defined as the direction of the associated ray at that point.

Figure 1:
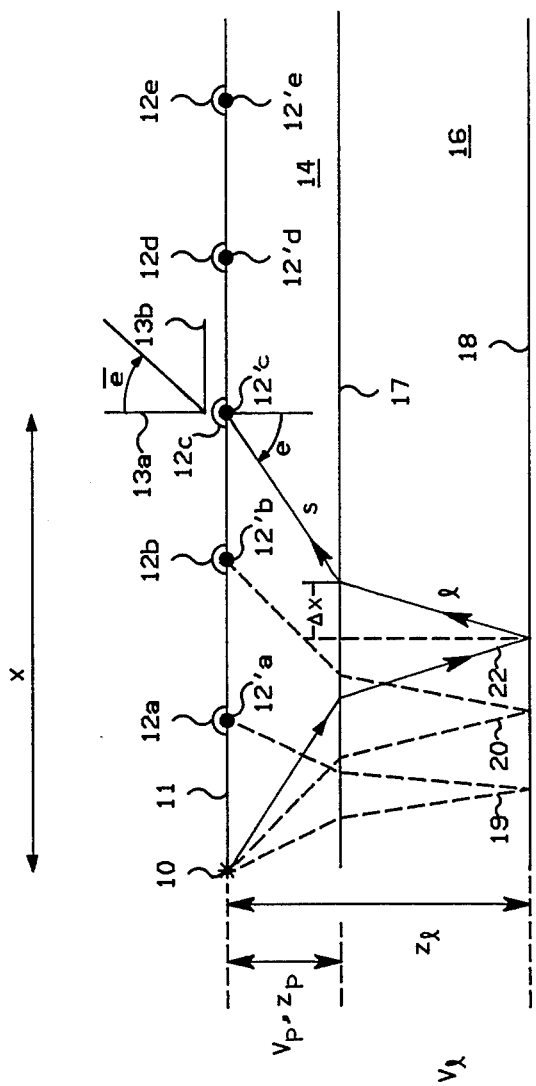
FIG. 1 is a schematic illustration of a seismic exploration apparatus and associated seismic wave paths.

Referring now to FIG. 1, a schematic representation of a surface seismic exploration apparatus is shown which includes a source 10 and geophone tools 12a–e positioned on the earth's surface 11. Geophone tools 12a–e are positioned on the surface at corresponding reception points 12'a–e which lie along the surface. Source 10 is a source of seismic energy which may be an electrically detonated explosive charge, an energy source capable of mechanically delivering impacts to the earth's surface, or any other seismic source which generates a seismic wave suitable for processing according to the present invention. As shown, geophone tools 12a–e are offset from source 10, and are preferably equidistantly spaced from one another. Each geophone tool comprises at least two mutually orthogonal geophones. One geophone is oriented to detect the vertical component of a received wave, and the other geophone is oriented to detect the radial component. The vertical and radial components are those components corresponding to particle motion along vertical axis 13a and radial axis 13b respectively. As shown, the radial axis is a horizontal axis such that the radial component is a horizontal component. Another component, the transverse component, is perpendicular to the radial component and also to the vertical component. A geophone for detection of the transverse component need not be provided. However, a 3-component geophone tool could be used, in which case the vertical and radial components could be computed if each geophone was not perfectly oriented with each axis. Furthermore, it should be understood that although 12a-e are considered geophone "tools" in the illustrated embodiment, such tools need not be used. Rather, two individual and discrete geophones oriented as described above could be positioned where each tool is shown. Five geophone tools are shown in the illustrated embodiment, but it should be understood that more or less could be employed as desired. Accuracy of results obtained by the present invention can be expected to be enhanced by utilization of a greater number of geophones. As is well known to those skilled in the art, the geophones act to transduce returning waves into representative electrical signals. The outputs of the geophones, usually denoted as seismic "wiggle" traces, are appropriately amplified and recorded on computer tape, for example. Data thus recorded can then be processed by a computer at the test site, or, as is more typical, processed by a computer at a remote facility.

Two earth layers are shown in FIG. 1. Layer 14 is an uppermost layer of the earth, having the earth's surface as its upper boundary. Layer 16 lies immediately below layer 14 such that these layers share a common boundary 17 wherein this boundary is the upper boundary of layer 16 and the lower boundary of layer 14. Layer 16 has a lower boundary 18. Furthermore, layer 14 is assumed to transmit seismic waves at a higher velocity than layer 16. For the sake of convenience, layer 14 will be denoted as a high velocity layer and layer 16 as a low velocity layer. Layers having velocity characteristics as described above are typically encountered in frigid regions wherein the upper layer is permafrost. In this kind of situation, layer 14 would be permafrost, and layer 16 would be an unfrozen layer.

Paths of waves received by geophones 12a, 12b, and 12c are shown at 19, 20, and 22 respectively. The paths corresponding to geophones 12d and 12e are not shown for sake of illustrative clarity. Path 22 is shown in bold lines, since this path will be referred to in the following description. In respect to this path, a wave generated at source 10 travels through layer 14 and then hits boundary 17 where refraction of the wave takes place. Because of the velocity characteristics of the two layers, the wave is bent toward the normal. The wave then travels through layer 16 and is reflected by the lower boundary 18 of layer 16. Accordingly, the reflected wave travels back through layer 16, is refracted at boundary 17, and is received by geophone tool 12c at reception point 12'c after traveling through layer 14. The direction from which the upcoming reflected wave approaches the upper boundary, the surface, of layer 14 is represented by the angle of emergence e. More precisely, the angle of emergence e from a boundary as used herein is defined as the acute angle defined between the directional path of a wave approaching the boundary and a vertical line. The angle of emergence e will be discussed below in further detail in connection with the data processing steps of the present invention.

Before proceeding to the various steps of this embodiment of the present invention, certain parameters will be defined. As shown in FIG. 1, $z_p$ and $z_l$ are depths of the boundaries 17 and 18 respectively. Similarly, $V_p$ and $V_l$ are the seismic wave velocities in layers 14 and 16 respectively. Distance l is the distance the reflected wave travels from the reflection point at boundary 18 to the boundary 17. Distance s is the distance traveled by the upcoming reflected wave from boundary 17 to the earth's surface. The angle of emergence e has been defined above, and the apparent angle of emergence $\bar{e}$ is related to the angle of emergence and will be defined below. Distance x is the horizontal distance from source 10 to a reception point and its corresponding geophone tool. $\Delta T$ is defined as the one way travel time of the wave between boundary 17, or the common boundary between the two layers, and boundary 18, the lower boundary of the low velocity layer. Finally $\Delta x$ is a distance parameter, an expression for which will be derived below. One way travel time from a boundary to a reflection point as used herein is defined as the travel time of the wave from the boundary to the reflection point, or the travel time from the reflection point to the boundary, these times being equal.

The parameters $V_p$ and $z_p$ are first determined by conventional techniques. $V_p$ is most conveniently found by detecting the direct arrival energy from source 10, that is the wave traveling from the source along the surface to any one of the geophones. The first event in the trace corresponds to this direct arrival wave. The travel time $T_d$ of the direct arrival wave is taken from this event. Since $V_p T_d = x$, $V_p = x/T_d$. A reflection event corresponding to a wave reflected from boundary 17 may be employed to determine $z_p$. In this regard, the two-way travel time T corresponding to this reflection event is employed in the following well known equation to derive the value for $z_p$:

$$z_p = \tfrac{1}{2}\sqrt{(V_p T)^2 - x^2} \quad (1)$$

Any variation of the above technique may be used to determine $z_p$ and $V_p$. For a detailed discussion of such techniques, reference is made to *Introduction to Geophysical Prospecting* by M. B. Dobrin, McGraw Hill, pp. 202-204, 1976, whose disclosure is incorporated by reference. For the case where velocity changes with depth, an excellent discussion can be found in *Quantitative Seismology: Theory and Methods* by K. Aki and P. G. Richards, Volume 1, W. H. Freeman, San Francisco, pp. 643-645, 1980, this disclosure also being herein incorporated by reference.

Figure 2:
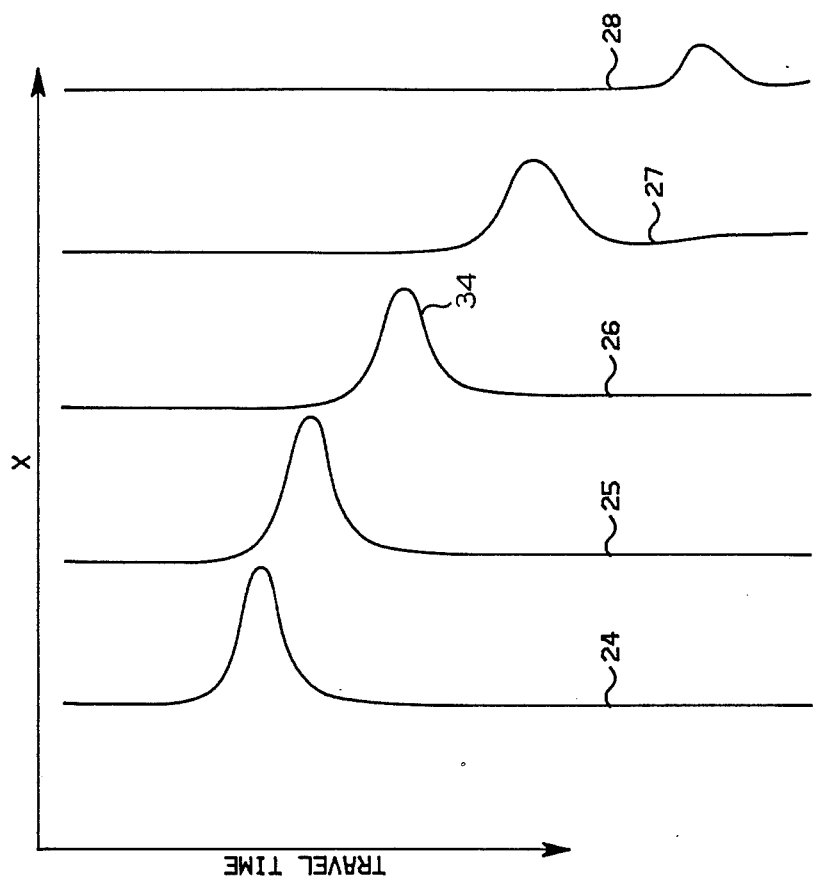
FIG. 2 is a vertical component record section which might be expected utilizing the FIG. 1 apparatus.

Referring now to FIG. 2, portions of seismic traces are schematically illustrated which might be expected utilizing the apparatus of FIG. 1. Traces 24, 25, 26, 27 and 28 correspond to traces detected by the vertical geophones in geophone tools 12a, b, c, d, and e respectively. The event shown for each trace corresponds to a wave reflected from boundary 18, and represents the vertical component of the detected wave.

Figure 3:
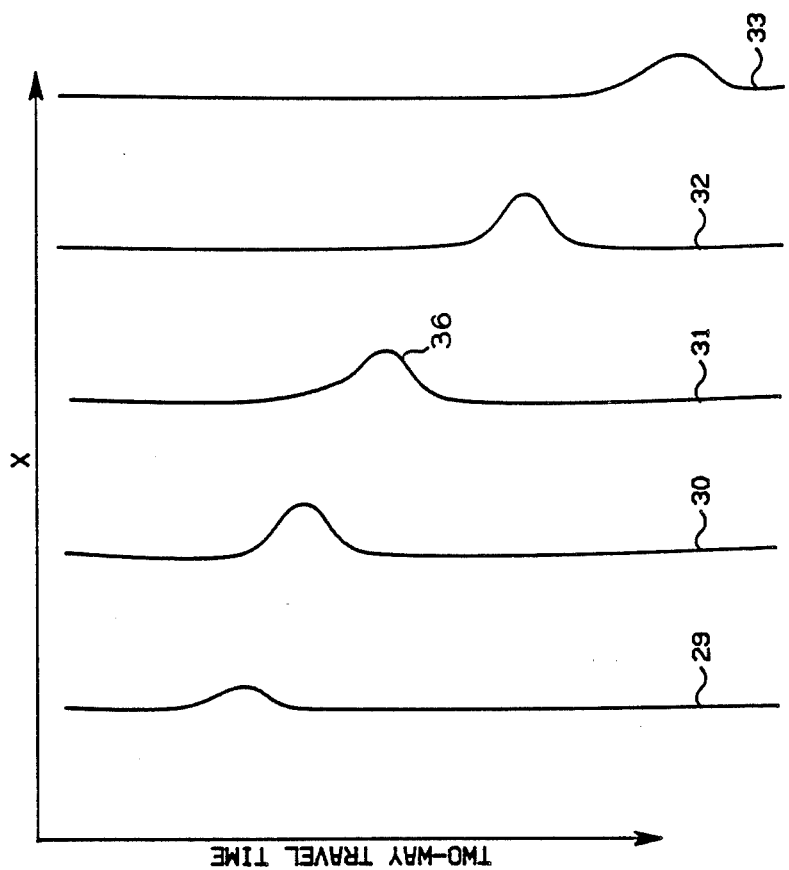
FIG. 3 is a radial component record section which might be expected with the FIG. 1 apparatus.

Referring to FIG. 3, radial component partial seismic traces 29, 30, 31, 32, and 33 are shown which correspond to geophone tools 12a, b, c, d, and e respectively. Each trace is detected by the radial geophone in a particular geophone tool.

It should be understood that actual radial and vertical traces detected by the geophones have many reflection events associated therewith. The event shown corresponds to a reflection from boundary 18 only, and has been extracted from the more complete traces registering many events. For example, in the illustrated case, the event corresponding to a reflection from boundary 18 would normally be the third event in a trace. The first two events correspond to a direct arrival wave and a wave reflected from boundary 17 respectively. Various data used in processing steps according to the present invention can now be obtained from the traces shown in FIGS. 2 and 3.

The emergence angle e is calculated as follows. Consider, for the sake of illustration, traces 26 and 31 which correspond to geophone tool 12c. The amplitude for a particular travel time is selected from peak 34, and the amplitude for the same travel time is selected from peak 36. Thus, a vertical component amplitude, $A_v$, and a radial component amplitude, $A_r$, are obtained. The apparent angle of emergence, or that angle detectable at the surface boundary, can be found from the relation $$\tan \bar{e} = \frac{A_r}{A_v}. \quad (2)$$

Since the apparent angle of emergence is calculated, the actual angle of emergence e can be found from the expression $$\sin e = \left(\frac{\alpha}{\sqrt{2\beta}}\right)\sqrt{(1 - \cos \bar{e})}, \quad (3)$$

where $\alpha$ and $\beta$ are S-wave velocities which can be calculated from P and S-wave direct arrivals. Alternately, a value for the velocity ratio of $\alpha/\beta$ can be assumed. This value is often assumed to be 2. Assuming this ratio for the sake of illustration, equation (3) becomes $$\sin e = \sqrt{2(1 - \cos \bar{e})}. \quad (4)$$

Vertical and radial component amplitudes corresponding to each geophone tool are obtained, and the angle of emergence e is computed employing equations (2), (3), and (4). Reference may be made to *An Introduction to the Theory of Seismology* by K. E. Bullen, Cambridge University Press, pp. 126–128, whose disclosure is incorporated by reference, for a discussion of e and $\bar{e}$, and for derivation of equations (2) and (3). It should be noted that the present angles are the complement of Bullen's. As an alternative to the above technique for computing e, the vertical and radial components could be plotted as a particle motion diagram, and the apparent angle of emergence determined from the diagram.

Since the preferred embodiment of the present method employs both vertical and horizontal (radial) components of the detected wave, a waveform should be generated by source 10 which, after reflection and return to the surface, has a vertical component and a horizontal component. A detected P-wave would be successfully employed to calculate e because particle motion of such a wave is in the direction of propagation. Thus, the P-wave has a vertical and a horizontal (or radial) component. An SV-wave (vertically polarized S-wave) could also be employed because it is characterized by particle motion perpendicular to the direction of propagation, such motion having a vertical and a horizontal (radial) component. An SH-wave (horizontally polarized S-wave) is also characterized by particle motion in a direction perpendicular to the direction of propagation. However, such particle motion is in the transverse direction, which is perpendicular to the radial direction shown in FIG. 1. Thus, an SH-wave has no vertical component, and could not be used in the preferred embodiment to calculate e. Furthermore, a wave detected by a geophone tool may be a combination of P and SV-wave motion, in which case a standard filtering operation would be used to separate the two waveforms as detected.

From the geometry of FIG. 1, it can be readily seen that $$\Delta x = x/2 - z_p \tan e, \quad (5)$$

wherein $\Delta x$ can be described functionally as the horizontal distance traveled by a wave between boundary 17 and boundary 18. As discussed above, each geophone tool has a corresponding x value, or offset distance from the source, and a corresponding emergence angle e. In addition, $z_p$ has been calculated by conventional techniques as already described.

Employing this data, $\Delta x$ is calculated for each geophone tool. $\Delta T$, which has been defined as the one-way travel time of a wave between boundary 17 and boundary 18, can be expressed as follows:

$$\Delta T = \frac{T}{2} - \frac{s}{V_p}, \quad (6)$$

where T is the two-way travel time from source to the geophone. From the Pythagorean theorem:

$$s^2 = z^2_p + (x/2 - \Delta x)^2, \quad (7)$$

so that by substituting the expression for S into equation (6), one obtains $$\Delta T = \frac{T}{2} - \sqrt{\frac{z_p^2 + (x/2 - \Delta x)^2}{V_p}}$$

A travel time T corresponding to each geophone tool can be obtained directly from reflection events in either the vertical component traces or the radial component traces.

$\Delta T$ is accordingly calculated for each geophone tool employing corresponding data.

From the Pythagorean theorem, an expression relating $(\Delta T)^2$ and $(\Delta x)^2$ can be written as follows:

$$(z_l - z_p)^2 + \Delta x^2 = l^2$$

$$(z_l - z_p)^2 + \Delta x^2 = (V_l \Delta T)^2$$

$$[(z_l - z_p)^2 + (\Delta x)^2][1/V_l^2] = (\Delta T)^2. \quad (9)$$

It can be readily seen that equation (9) is a linear relation of the general form $(\Delta T)^2 = m(\Delta x)^2 + b$ where m is the slope and b is the intercept. Thus, in equation (9), the slope m can be expressed as follows:

$$m = \frac{1}{V_l^2} \quad (10)$$

The intercept b can be expressed as:

$$b = \frac{(z_l - z_p)^2}{V_l^2} \quad (11)$$

The Δx and ΔT values as calculated above are now squared to yield $(\Delta x)^2$ and $(\Delta T)^2$ values. Thus, a data pair has been calculated for each geophone tool. Each data pair comprises a $(\Delta x)^2$ value and a $(\Delta T)^2$ value.

A linear equation is now fitted to data pairs thus calculated. The most convenient fitting technique is the least squares fitting technique, although any regression fitting technique could be utilized. A thorough discussion of least squares fitting can be found in *Data Reduction and Error Analysis for the Physical Scientist* by Phillip R. Berington, McGraw Hill Inc., 1969. Thus, this fitting operation yields a value for slope m and intercept b for all the data pairs. These values are substituted into the following expressions to yield values for $(z_l-z_p)$ and $V_l$, wherein these expressions have been derived from equations (10) and (11):

$$V_l = \sqrt{\frac{1}{m}} \quad (12)$$

and $$z_l - z_p = v_l \sqrt{b} \quad (13)$$
$$= \sqrt{\frac{b}{m}}$$

It should be noted in particular that $z_l-z_p$ is the thickness of layer 16.

Figure 4:
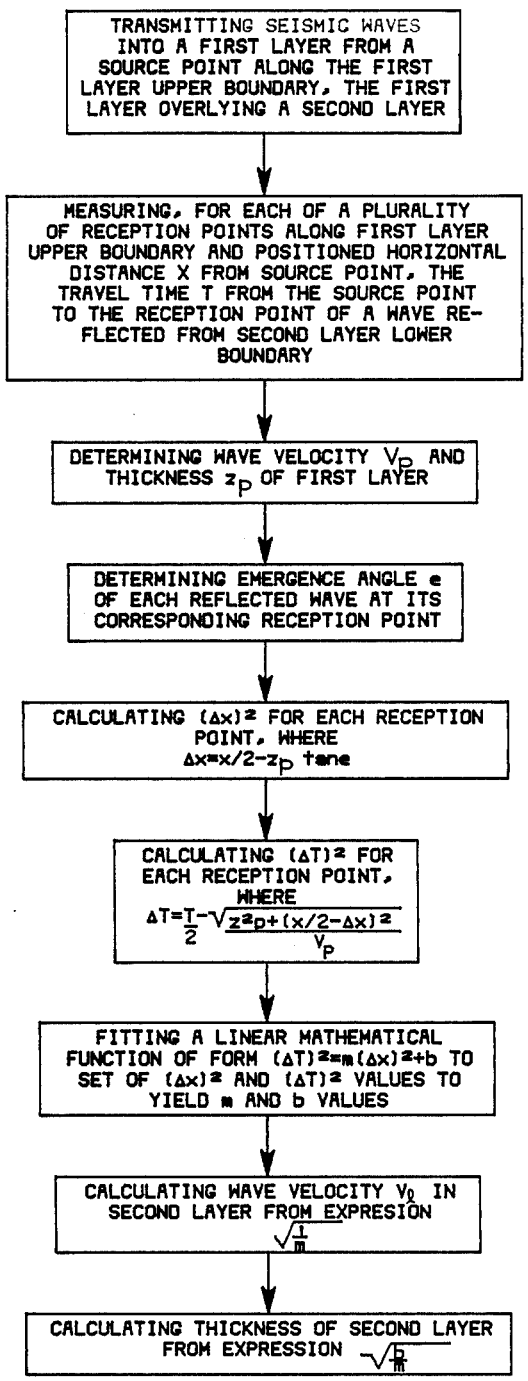
FIG. 4 is a flow chart which summarizes the various steps in one embodiment of the present method.

Referring now to FIG. 4, a flow chart is shown summarizing the above described steps of a preferred embodiment. It should be understood that the data processing steps are most typically performed by a computer according to a suitable program.

A calculated example will now be described which should not be construed to limit the invention in any manner. The example will be described in terms of the type of apparatus shown in FIG. 1 having five geophone tools, and in terms of an upper high velocity layer (such as permafrost) overlying a lower low velocity layer. The following assumptions are made as to the upper layer: $V_p=4.570$ km/s and $z_p=0.609$ km. As to the lower layer, the following values are assumed to calculate travel times T: $v_l=2.190$ km/s and $z_l=1.218$ km. Processing steps are based on the x, T, and amplitude ratio $(A_r/A_v)$ data, wherein each data column is labeled to indicate its corresponding geophone tool in FIG. 1. $A_r/A_v$ has been calculated utilizing the traces shown in FIGS. 2 and 3.

|       | 12a   | 12b   | 12c   | 12d   | 12e   |      |
|-------|-------|-------|-------|-------|-------|------|
| x     | .3045 | .6090 | .9135 | 1.2180| 1.5225| (km) |
| T     | .8283 | .8447 | .8771 | .9060 | .9478 | (s)  |
| $A_r/A_v$ | 5.9 | 2.9 | 2.0 | 1.5 | 1.2 |      |

The above $A_r/A_v$ ratios are applied to equation (2) to give $\bar{e}$ values. The corresponding e values are calculated using equation (3). The $\bar{e}$ and e values thus calculated are given in the table below.

|       | 12a  | 12b   | 12c   | 12d   | 12e   |       |
|-------|------|-------|-------|-------|-------|-------|
| $\bar{e}$ | 9.57 | 18.62 | 26.72 | 33.61 | 39.23 | (deg) |
| e     | 9.63 | 18.92 | 27.59 | 35.42 | 42.29 | (deg) |

$(\Delta x)^2$ and $(\Delta T)^2$ are calculated from equations (5) and (6) respectively to yield the following set of values:

|          | 12a   | 12b   | 12c   | 12d   | 12e   |              |
|----------|-------|-------|-------|-------|-------|--------------|
| $(\Delta T)^2$ | 7.774 | 7.903 | 8.130 | 8.379 | 8.605 | $\times 10^{-2}$ (s$^2$) |
| $(\Delta x)^2$ | .2368 | .9169 | 1.911 | 3.093 | 4.286 | $\times 10^{-2}$ (km$^2$) |

Figure 5:
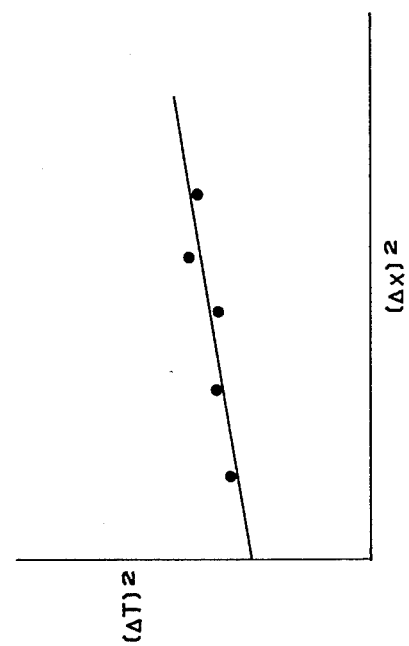
FIG. 5 shows the graphical relationship between $(\Delta x)^2$ and $(\Delta T)^2$, parameters which will be described in detail below.

The five data pairs thus obtained are fitted to a linear equation by a least squares fitting technique. A slope m of 0.208, and an intercept b of 0.772 are obtained from this fitting operation. FIG. 5 illustrates the fitting of the five data pairs to obtain a linear equation. The m and b values are substituted into equations (12) and (13) respectively to give the following results: $V_l=2.193$ and $z_l=1.218$. It can be seen that these values calculated according to the present invention compare favorably with the originally assumed values for $V_l$ and $z_l$.

Thus, there is provided by the present invention an effective method for determining the thickness and associated wave velocity of a low velocity layer of the earth lying beneath a high velocity layer.

Obviously many modifications of the present invention are possible in light of the above teachings. Therefore, it is to be understood that the invention may be practiced otherwise than as specifically described. For example, the method of the present invention can be applied to a high velocity layer which lies under a low velocity layer.

What is claimed is:

1. A method of collecting and processing seismic data with respect to a first layer of the earth and a second layer of the earth having different seismic wave transmission velocity characteristics than said first layer, each layer having an upper boundary and a lower boundary, wherein the first layer overlies the second layer such that each layer has a common boundary, the common boundary being the lower boundary of the first layer and the upper boundary of the second layer, said method comprising the steps of:

(a) transmitting a plurality of seismic waves into the first layer from a source point located along the first layer upper boundary;

(b) selecting a plurality of reception points along the first layer upper boundary, wherein each reception point is positioned at a different horizontal distance x from the source point;

(c) measuring, for each reception point, the travel time T from the source point to the reception point of a wave reflected by the second layer lower boundary;

(d) determining the wave velocity $V_p$ and the thickness $z_p$ with respect to the first layer;

(e) determining the emergence angle e of each said reflected wave at its corresponding reception point;

(f) determining a parameter Δx for each reception point, wherein;

$\Delta x = x/2 - z_p \tan e$;

(g) determining a parameter ΔT for each reception point, wherein $$\Delta T = \frac{T}{2} - \frac{\sqrt{z_p^2 + (x/2 - \Delta x)^2}}{V_p};$$

(h) determining $(\Delta x)^2$ and $(\Delta T)^2$ for each reception point, thereby yielding a set of data pairs, each data pair comprising a $(\Delta x)^2$ value and a $(\Delta T)^2$ value;

(i) fitting a linear mathematical function of the form $(\Delta T)^2 = m(\Delta x)^2 + b$ to said data pairs so as to yield a slope (m) value and an intercept (b) value;

(j) determining the wave velocity $V_l$ in the second layer from the expression $$\sqrt{\frac{1}{m}} \; ;$$

and (k) determining the thickness of the second layer from the expression $$\sqrt{\frac{b}{m}} \; .$$

2. A method as recited in claim 1, wherein each said reflected wave has a vertical component and a horizontal component, wherein step (e) comprises: detecting a vertical component amplitude $A_v$ and a horizontal component amplitude $A_r$ for each reflected wave at its corresponding reception point, where each said amplitude for a particular wave is detected at the same travel time; and determining the emergence angle e for each wave at its corresponding reception point by utilizing the ratio $A_r/A_v$.

3. A seismic method of determining the thickness of a subterranean layer and the velocity of seismic waves in the layer comprising the steps of:

(a) transmitting seismic waves into the layer;

(b) detecting a plurality of waves wherein each said detected wave is reflected from a different point along the lower boundary of the layer;

(c) determining $\Delta x$ for each said reflected wave, wherein $\Delta x$ is defined as the horizontal distance a wave travels between the upper boundary and the lower boundary of the layer;

(d) determining $\Delta T$ for each said reflected wave, wherein $\Delta T$ is defined as the one way travel time of a wave between the upper boundary and the lower boundary of the layer;

(e) determining $(\Delta x)^2$ and $(\Delta T)^2$ for each reflected wave, thereby yielding a set of data pairs, each data pair comprising a $(\Delta x)^2$ value and a $(\Delta T)^2$ value;

(f) fitting a linear mathematical function of the form $(\Delta T)^2 = m(\Delta x)^2 + b$ to said data pairs so as to yield a slope (m) value and an intercept (b) value;

(g) determining the wave velocity $V_l$ in the layer from the expression $$\sqrt{\frac{1}{m}} \; ;$$

and (h) determining the thickness of the layer from the expression $$\sqrt{\frac{b}{m}} \; .$$

* * * * *

UNITED STATES PATENT AND TRADEMARK OFFICE
CERTIFICATE OF CORRECTION

PATENT NO. : 4,943,918

DATED : July 24, 1990

INVENTOR(S) : Roger A. Young

It is certified that error appears in the above-identified patent and that said Letters Patent is hereby corrected as shown below:

Column 9, claim 1, line 3, "pl" should be deleted with respect to both occurrences.

Column 9, claim 1, line 4, "(i)" should be a new subparagraph.

Column 9, claim 1, line 5, "$(\Delta^T)^2$" should be --- $(\Delta T)^2$ ---.

Signed and Sealed this

Third Day of September, 1991

*Attest:*

HARRY F. MANBECK, JR.

*Attesting Officer*     *Commissioner of Patents and Trademarks*